United States Patent [19]

Sato

[11] Patent Number: 5,516,062

[45] Date of Patent: May 14, 1996

[54] PRESSURE CONTACT CABLE HOLDER

[75] Inventor: Shigeru Sato, Kawasaki, Japan

[73] Assignee: Yamaichi Electronics Co., Ltd., Tokyo, Japan

[21] Appl. No.: 194,000

[22] Filed: Feb. 9, 1994

[30] Foreign Application Priority Data

Feb. 10, 1993 [JP] Japan .................................. 5-045917

[51] Int. Cl.⁶ ............................................................ F16L 3/00
[52] U.S. Cl. ...................... 248/68.1; 248/74.2; 248/316.7
[58] Field of Search ................................ 248/68.1, 74.2, 248/49, 58, 316.7; 24/135 N, 578, 580, 305

[56] References Cited

U.S. PATENT DOCUMENTS

| | | | |
|---|---|---|---|
| 1,649,542 | 11/1927 | Parks | 248/68.1 |
| 3,363,864 | 1/1968 | Olgreen | 248/68.1 |
| 3,916,089 | 10/1975 | Sloan | 248/74.2 X |
| 3,924,676 | 12/1975 | Bennett | 248/68.1 X |
| 4,431,152 | 2/1984 | Reed, Jr. | 248/68.1 X |
| 4,899,964 | 2/1990 | Sick | 248/68.1 |
| 5,029,782 | 7/1991 | Andre et al. | 248/74.2 |
| 5,277,006 | 1/1994 | Ruster | 248/68.1 X |

FOREIGN PATENT DOCUMENTS 1101275 10/1955 France .................................. 248/68.1

*Primary Examiner*—Karen J. Chotkowski
*Attorney, Agent, or Firm*—Wenderoth, Lind & Ponack

[57] ABSTRACT

A pressure contact cable holder comprises a plurality of first holding claws spacedly arranged in a row and a plurality of second holding claws spacedly arranged in a row in parallel relation to the first holding claws. First grooves are formed between adjacent ones of the first holding claws and are adapted to hold two cables passing therethrough, and second grooves are formed between adjacent ones of the second holding claws and are adapted to hold two cables passing therethrough. The first grooves are displaced relative to the second grooves in a direction of the row. Two cables are held by one of the first grooves and are also held by two adjacent second grooves having a common second holding claw arranged opposite the first grooves. Contact receiving ports are arranged in position in conformity with the cables and between the first grooves group and the second grooves group.

14 Claims, 5 Drawing Sheets

PRESSURE CONTACT CABLE HOLDER

BACKGROUND OF THE INVENTION

1. Field of the Invention

This invention relates to a pressure contact cable holder for holding a plurality of cables, which are laid at predetermined pitches, in predetermined pressure contact positions where the cables are in pressure contact with contacts.

2. Description of the Prior Art

A conventional pressure contact cable holder is constructed as follows. As shown in FIG. 8, a plurality of holding claws 32 are arranged in a row along each of the opposite sides of a rectangular holder body 31 which is made of an electrically insulative material, and grooves 33 for laying cables are formed between adjacent holding claws 32 in a direction of the row, such that the holding claws 32 and grooves 33 of one row (one side) are positioned in conformity (are aligned) with the holding claws 32 and grooves 33, respectively, of the other row (the other side), respectively. In use, each cable, which is used for pressure contact with each contact, is laid straight in the opposite grooves and held by and between the adjacent holding claws. Inlet ports 35 for receiving contacts are formed in a central portion of the holder body 31 in two rows. The inlet ports 35 of one row are respectively positionally offset by ½ pitches in the direction of the row relative to the inlet ports 35 of the other row. The inlet ports 35 of the first-mentioned row of inlet ports 35 are arranged opposite every other groove 33 respectively, of the first-mentioned row of the claws 32 and grooves 33. Likewise, the inlet ports 35 of the second-mentioned row of inlet ports 35 are arranged opposite every other groove 33, respectively, of the second-mentioned row of the claws 32 and grooves 33. In use, the contacts are inserted respectively into the inlet ports 35 so as to be in pressure contact respectively with core wires of the cables 34 between the respective opposing grooves 33.

However, in the pressure contact cable holder of the type mentioned above, with the tendency toward narrower pitch arrangements of contacts, the holding claws 32 are also required to be arranged at narrower pitches. The results are that the claws are made thinner and thus lowered in strength. This makes it difficult for the claws to have a sufficient amount of strength for holding cables. Moreover, the prior art has the problem in that when a cable 34 having a large diameter is inserted into the grooves 33, the holding claws 32 are broken.

OBJECT AND SUMMARY OF THE INVENTION

It is therefore an object of the present invention to provide a pressure contact cable holder, in which holding claws are arranged at comparatively large pitches even if cables are arranged at small pitches, so that the holding claws are prevented from being broken as in the prior art and are capable of firmly holding a cable.

According to the present invention, there is provided, in order to achieve the above object, a pressure contact cable holder comprising a plurality of first holding claws spacedly arranged in a row and a plurality of second holding claws spacedly arranged in a row in parallel relation to the row of first holding claws. Each of a plurality of first grooves are formed between adjacent ones of the first holding claws and adapted to hold two cables passing therethrough, and each of a plurality second grooves are formed between adjacent ones of the second holding claws and adapted to hold two cables passing therethrough. The first grooves are arranged in such a manner as to be displaced relative to each other in phase in a direction of the row relative to the second grooves. One of two cables, which are held by two adjacent ones of the first grooves, and the other of the two cables are together held in a second groove arranged on a line between the two adjacent first grooves. Contact receiving ports are arranged in positions in conformity with the cables and between the row of first grooves and the row of second grooves.

Other objects and advantages of the invention shall become apparent from the following description when read in conjunction with the drawings.

DETAILED DESCRIPTION OF THE EMBODIMENTS

Embodiments of the present invention will now be described with reference to FIGS. 1 through 7.

Figure 1:
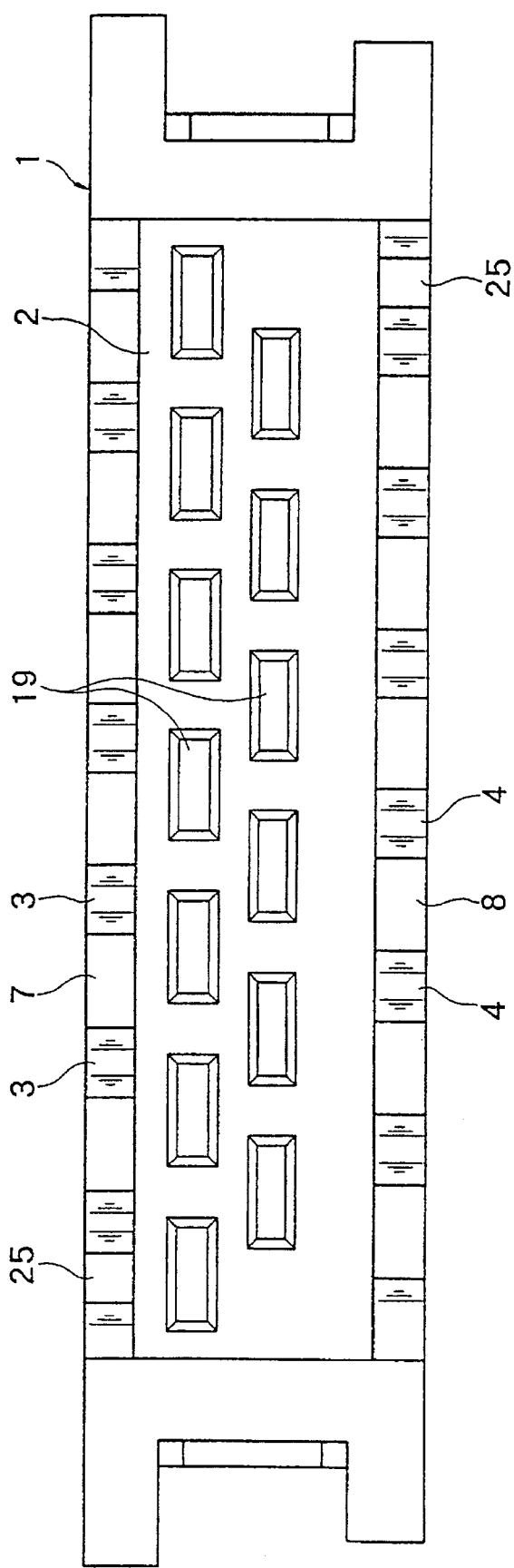
FIG. 1 is a plan view of a cable holder according to one embodiment of the present invention.

As shown in FIG. 1, a cable holder 1 comprises a rectangular holder body 2 which is made of an electrically insulative material. The holder body 2 includes a plurality of first holding claws 3 spacedly arranged in a row along one longitudinal side thereof and a plurality of second holding claws 4 spacedly arranged in a row along the opposite longitudinal side, the first and second holding claws 3 and 4 being in parallel relation to each other.

Figure 2:
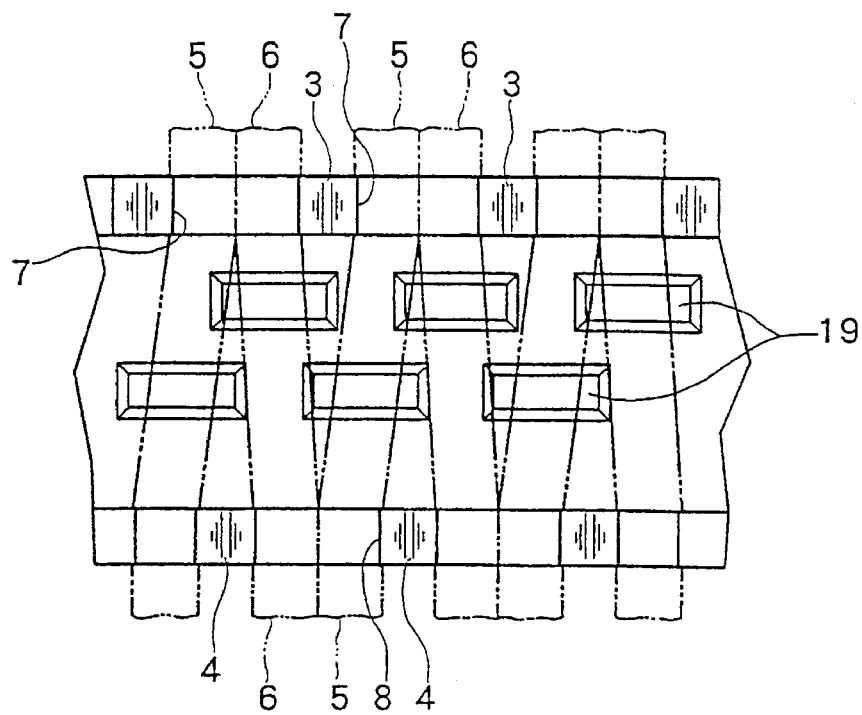
FIG. 2 is a plan view showing a part of the above cable holder but with a cable held by the holder.

As shown in FIG. 2, first grooves 7, each for holding two cables passing therethrough in parallel relation, are each formed between adjacent first holding claws 3. Likewise, second grooves 8, each for holding two cables passing therethrough in parallel relation, are each formed between adjacent second holding claws 4. The first and second grooves 7, 8 are positionally displaced in the direction of the row (that is, in a zigzag relation) so that the first holding claws 3 are positioned opposite the second grooves 8, respectively, and the second holding claws 4 are positioned opposite the first grooves 7, respectively. In other words, the first and second grooves are arranged at equal pitches, but the first grooves are displaced in phase in the direction of the row relative to the second grooves. Accordingly, each of the second grooves 8 is arranged on a line between adjacent first grooves 7. The arrangement of and between the first and second holding claws 3 and 4 is like the arrangement of and between the first and second grooves 7 and 8.

Figure 5:
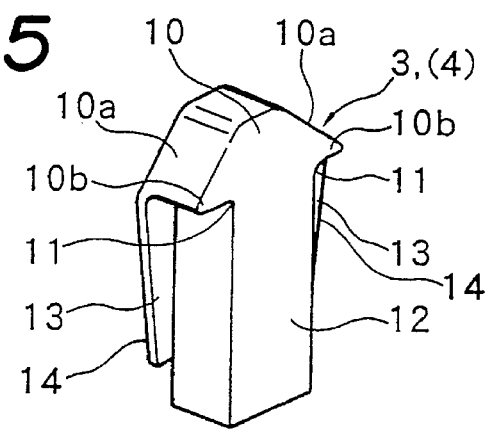
FIG. 5 is a perspective view showing a holding claw employed in the above embodiment.

As shown in FIG. 5, each of the first and second holding claws 3 and 4 comprises a converging upper end portion 10 which includes opposite inclined surfaces 10a for guiding the introduction of the cables 5 and 6, and a support post portion 12 having a twisted portion 11 formed at a lower part of the converging portion 10 for defining one of the first or second grooves 7 or 8. Each of the first and second holding claws 3 and 4 is provided with projections 13 formed along and projecting from outer side edges of the support post 12 from the opposite chin portions 10b of the converging end portion 10, so as to limit the first groove 7 or second groove 8.

Figure 6:
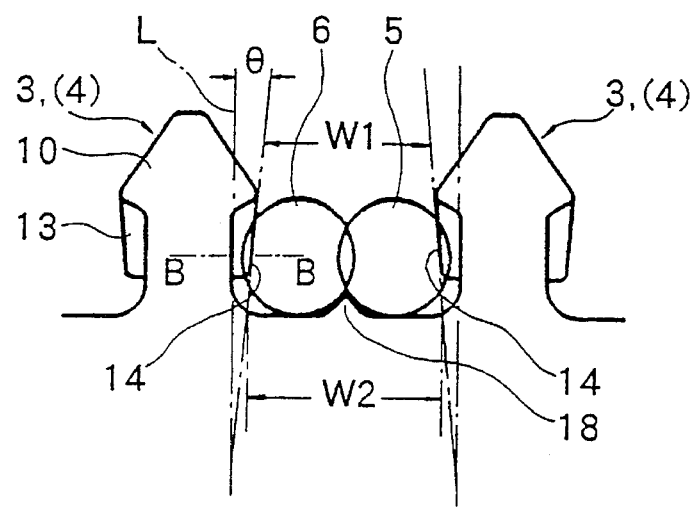
FIG. 6 is a front view showing two cables held in first and second grooves held between adjacent first (or second) holding claws.

As shown in FIG. 6, a projecting edge 14 of each of the projections 13 has an inclination angle θ relative to a vertical line L. A distance between the projecting edges 14 of the pair of projections 13 projecting inwardly of the grooves 7 and 8 is larger W1 at an upper part thereof and smaller W2 at a lower part thereof, so that the cables 5 and 6 will not easily escape from the first or second grooves 7 or 8. That is, owing to the provision of the projections 13, the opening width of the first and second grooves 7 and 8 is small on the inlet side and becomes gradually larger toward the bottom portion.

As shown in FIG. 6, the projections 13 compress electric insulative coatings 17 of the cables 5 and 6 held in parallel in the first and second grooves 7 and 8, and the compressed cables 5 and 6 are engaged with the chin portions 10b by reaction, such that the cables 5 and 6 will not easily escape from the grooves. In the case of a cable having a comparatively large diameter, the projections 13 are deformed so as to allow insertion thereof. Accordingly, the projections 13 are formed thin so that they can be elastically deformed relative to a cable having a large diameter.

Each of the first and second grooves 7 and 8 has at a central portion of a bottom surface thereof a rib 18 projecting upwardly as shown in FIG. 6. The rib 18 is inserted between the two cables 5 and 6 held in the first and second grooves 7 and 8 to determine a holding position.

In use, two cables 5 and 6 are inserted into one of the first grooves 7 and held by and between the adjacent first holding claws 3. One cable 5 of the two cables 5 and 6 held in one of the first grooves 7 is also laid in one of two adjacent second grooves 8 which are on opposite sides of a common second holding claw 4 opposite the first groove 7, and the other cable 6 of the two cables 5 and 6 is also laid in the other of the two adjacent second grooves 8. As a result, the two cables 5 and 6 are laid in the first and second grooves 7 and 8. In other words, two cables which are engageable with a common holding claw 3 are both laid in and held by the one of the second grooves 8 which is opposite the common holding claw 3.

Furthermore, as shown in FIG. 1, inlet ports 19 for receiving the contacts 20 are arranged in two rows located in a central portion of the holder body 2, and in conformity with the respective cables 5 and 6, between the row of first grooves 7 and the row of second grooves 8.

Figure 3:
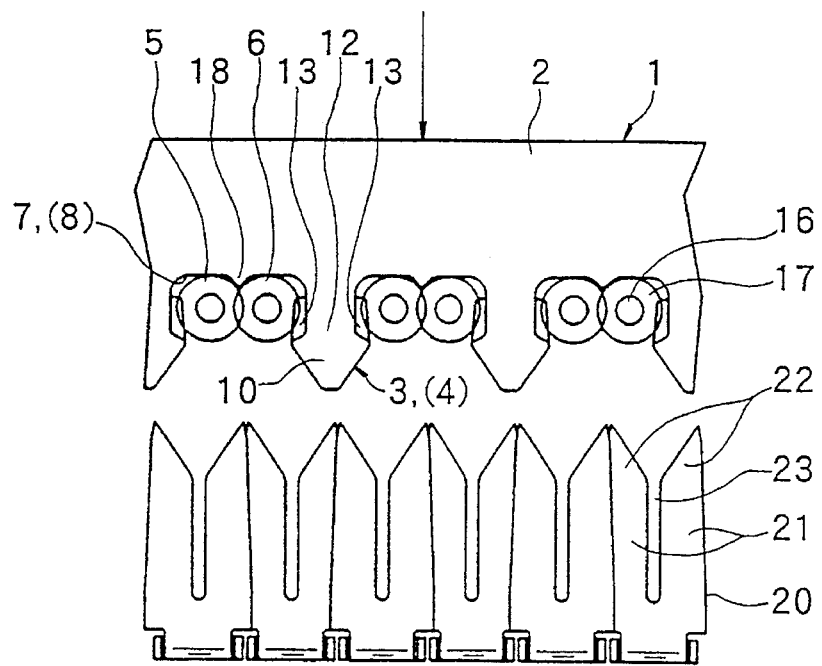
FIG. 3 is a side view of the cable holder of FIG. 1, but with a cable held by the holder and in which a contact is not yet brought into pressure contact with the cable.
Figure 4:
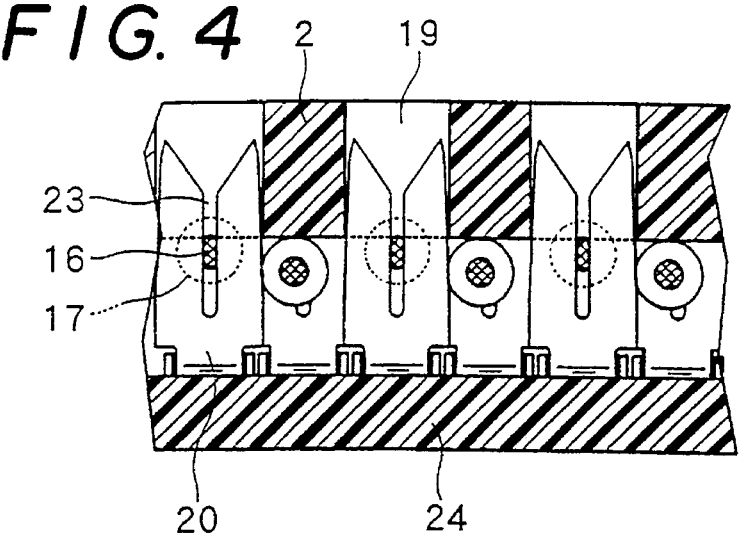
FIG. 4 is a cross-sectional view of the cable holder of FIG. 1, but with a cable held by the holder and in which a contact is in pressure contact with the cable.

As shown in FIGS. 3 and 4, the contacts 20 are implanted in a substrate 24. Each of the contacts 20 is bifurcated into clamping elements 21 which are pointed at a foremost end (free end) thereof. A press-in slot 23 is formed between the clamping elements 21. When the holder body 2 is pushed against the contacts 20 in a direction as indicated by an arrow using a suitable jig, the clamping elements 21 are inserted into the inlet ports 19 in the holder body 2 and at the same time, the pointed foremost end portions 22 of the clamping elements 21 are caused to pierce and tear the electric insulative coatings 17 of the cables. Then, the wire cores 16 are pressed into the slots 23 between the clamping elements 21, respectively, so that the wire cores 16 are pressure contacted by the clamping elements 21.

In the above embodiment, since an odd number, 13 for example, of the cables 5 and 6 are laid two each in and held by the first and second grooves 7 and 8, as shown in FIG. 1, one small groove 25 having a narrower width is provided at one end of the row of first grooves 7 and another small groove 25 is provided at the other end of the row of second grooves 8 so that one cable is held by each of the small grooves 25.

In order to hold 13 cables, for example, 13 grooves were conventionally required for each row. However, in the abovementioned embodiment, 6 first grooves 7 plus one small groove 25 and 6 second grooves 8 plus another small groove 25, thus 14 grooves in total, are good enough. This means that the number of the grooves can be reduced to 6 for each row. Therefore, if the length of the holder body 2 is equal to that of the conventional holder body, the first and second holding claws 3 and 4 can be made large in order to greatly increase the strength thereof. In addition, a sufficient amount of engagement width can be obtained relative to the cables 5 and 6, the first and second holding claws 3 and 4 can be positively prevented from being broken, and at the same time, the cables 5 and 6 are effectively prevented from escaping.

As described above, sufficient amounts of cable engagement width is obtained for the respective holding claws 3 and 4. The cables 5 and 6 are obliquely laid in the first and second grooves 7 and 8. Owing to this arrangement, the respective cables 5 and 6 are positively pushed against the first and second holding claws 3 and 4, so that the claws 3 and 4 can be reliably engaged with the chin portions 10b, respectively.

Figure 7:
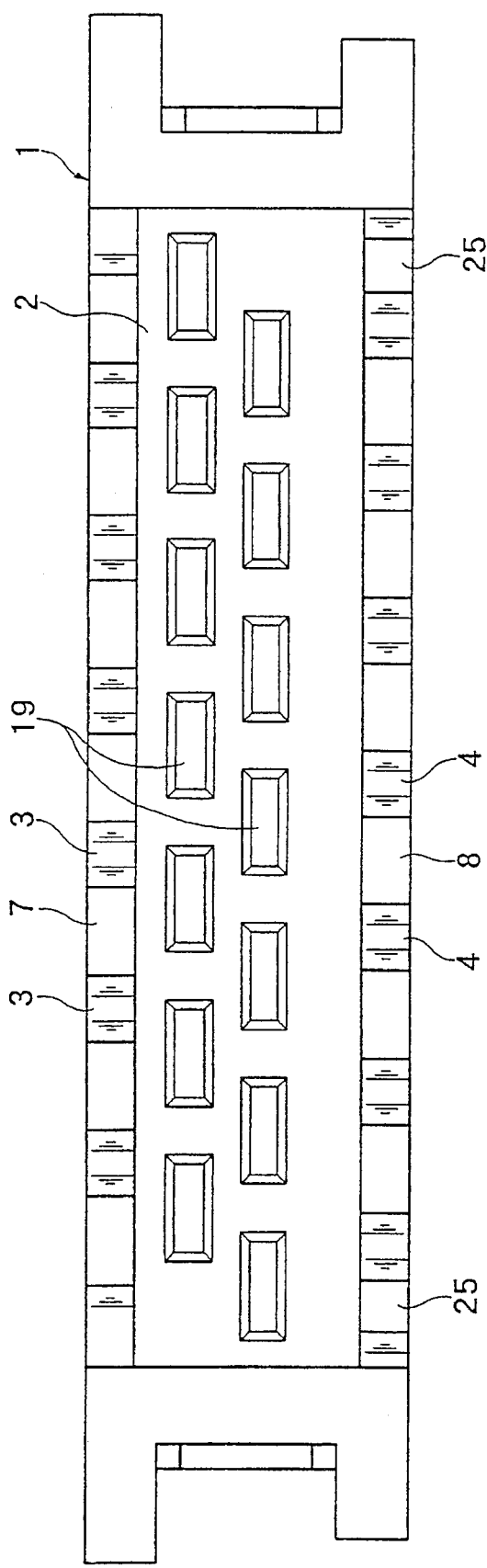
FIG. 7 is a plan view of a cable holder according to another embodiment of the present invention.
Figure 8:
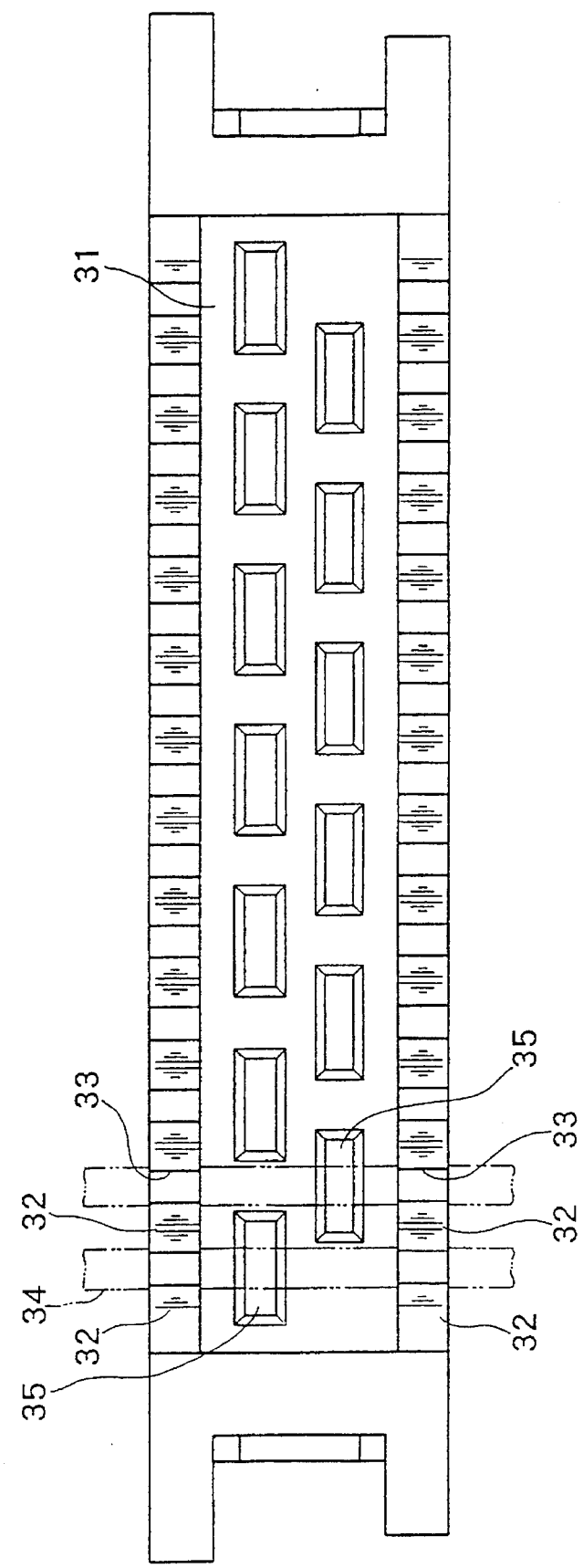
FIG. 8 is a plan view showing a conventional cable holder.

Another embodiment of the present invention will now be described with reference to FIG. 7.

This embodiment is for use in a case where an even number, 14 for example, of the cables 5 and 6 are laid by twos in the first and second grooves 7 and 8. In this case, two grooves 25 having a small width are provided on opposite ends of either the row of the first grooves 7 or the row of the second grooves 8.

It may be designed such that the second grooves 8 are positionally offset by ½ pitch relative to the first grooves 7.

As described above, according to the present invention, the respective first grooves and the respective second grooves, which are formed between the adjacent first holding claws on one row and between the adjacent second holding claws on the other row, respectively, are positionally offset in the direction of the row, and one each of the two cables held in the respective adjacent first grooves, thus two cables in total, are held in the respective second grooves arranged on a line between the adjacent first grooves. Owing to this arrangement, the respective holding claws can be arranged at large pitches and yet the holding claws can be made large to greatly increase the strength. Accordingly, this arrangement can correctly cope with the increasing need for the small pitch arrangement of contacts. In addition, even if cables having a large diameter are inserted into the respective grooves, the holding claws can be prevented from being broken.

Furthermore, owing to the large pitch arrangement of the holding claws, a sufficient amount of engagement width can be obtained for each cable. Each cable is obliquely laid in the first and second grooves and pushed against the first and second holding claws. Owing to this arrangement, the cable can be prevented from easily escaping from the grooves, and therefore, the cables can be more reliably engaged with the holding claws.

What is claimed is:

1. A cable holder comprising:

a holder body;

a plurality of first holding claws mounted in spaced apart relation in a first row on said holder body, a plurality of first grooves being respectively defined between adjacent pairs of said first holding claws;

a plurality of second holding claws mounted in spaced apart relation in a second row on said holder body, a plurality of second grooves being respectively defined between adjacent pairs of said second holding claws;

wherein said first row of said first holding claws is spaced apart from and disposed parallel to said second row of said second holding claws;

wherein said first grooves are displaced relative to said second grooves, respectively, in a direction of said first and second rows;

wherein contact receiving ports are formed through said holder body in at least one row disposed between said first row of said first holding claws and said second row of said second holding claws; and wherein said at least one row of said contact receiving ports is parallel to said first row of said first holding claws and said second row of said second holding claws.

2. A cable holder as recited in claim 1, wherein each of said first grooves comprises two adjacent cable holding halves;

each of said second grooves comprises two adjacent cable holding halves; and each of said contact receiving ports is positioned on a line between a cable holding half of one of said first grooves and a cable holding half of one of said second grooves.

3. A cable holder as recited in claim 1, wherein each of said first grooves comprises two adjacent cable holding halves;

each of said second grooves comprises two adjacent cable holding halves; and each of said contact receiving ports is substantially centered on a line between a center of a cable holding half of one of said first grooves and a center of a cable holding half of one of said second grooves.

4. A cable holder as recited in claim 1, wherein said at least one row of said contact receiving ports comprises first and second parallel port rows of said contact receiving ports; and wherein said contact receiving ports of said first port row are displaced relative to said contact receiving ports of said second port row, respectively, in a direction of said first and second port rows.

5. A cable holder as recited in claim 4, wherein each of said first grooves comprises two adjacent cable holding halves;

each of said second grooves comprises two adjacent cable holding halves; and each of said contact receiving ports of said first and second port rows is positioned on a line between a cable holding half of one of said first grooves and a cable holding half of one of said second grooves.

6. A cable holder as recited in claim 4, wherein each of said first grooves comprises two adjacent cable holding halves;

each of said second grooves comprises two adjacent cable holding halves; and each of said contact receiving ports is substantially centered on a line between a center of a cable holding half of one of said first grooves and a center of a cable holding half of one of said second grooves.

7. A cable holder as recited in claim 1, wherein each of said first and second holding claws comprises a support post portion projecting from said holder body, and a projection wall projecting from each of two opposing sides of said support post portion into an adjacent one of said first and second grooves, each of said projection walls being thinner, along a direction perpendicular to said direction of said first and second rows, than each of said support post portions.

8. A cable holder as recited in claim 7, wherein each of said first and second holding claws further comprises a head portion at a free end of said support post portion having opposing inclined surfaces which converge in a direction away from a base end of said support post portion.

9. A cable holder as recited in claim 7, wherein outer edges of said projection walls are inclined relative to a line perpendicular to a surface of said holder body; and portions of said first and second grooves defined between opposing ones of said projection walls narrow in a direction away from said surface of said holder body.

10. A cable holder as recited in claim 1, further comprising pairs of cables disposed in said first grooves, respectively; and wherein a first cable of each of said pairs of cables is further disposed in one of said second grooves, and a second cable of each of said pairs of cables is further disposed in another of said second grooves adjacent said one of said second grooves.

11. A cable holder comprising:

a holder body;

a plurality of first holding claws mounted in spaced apart relation in a first row on said holder body, a plurality of first grooves being respectively defined between adjacent pairs of said first holding claws;

a plurality of second holding claws mounted in spaced apart relation in a second row on said holder body, a plurality of second grooves being respectively defined between adjacent pairs of said second holding claws;

wherein said first row of said first holding claws is spaced apart from and disposed parallel to said second row of said second holding claws;

wherein said first grooves are displaced relative to said second grooves, respectively, in a direction of said first and second rows;

wherein pairs of cables are disposed in said first grooves, respectively; and wherein a first cable of each of said pairs of cables is further disposed in one of said second grooves, and a second cable of each of said pairs of cables is further disposed in another of said second grooves adjacent said one of said second grooves.

12. A cable holder as recited in claim 11, wherein each of said first and second holding claws comprises a support post portion projecting from said holder body, and a projection wall projecting from each of two opposing sides of said support post portion into an adjacent one of said first and second grooves, each of said projection walls being thinner, along a direction perpendicular to said direction of said first and second rows, than each of said support post portions.

13. A cable holder as recited in claim 12, wherein each of said first and second holding claws further comprises a head portion at a free end of said support post portion having opposing inclined surfaces which converge in a direction away from a base end of said support post portion.

14. A cable holder as recited in claim 12, wherein outer edges of said projection walls are inclined relative to a line perpendicular to a surface of said holder body; and portions of said first and second grooves defined between opposing ones of said projection walls narrow in a direction away from said surface of said holder body.

* * * * *